(12) United States Patent
Manes et al.

(10) Patent No.: US 9,303,709 B2
(45) Date of Patent: Apr. 5, 2016

(54) SHOCK DAMPER

(71) Applicant: Goodrich Corporation, Charlotte, NC (US)

(72) Inventors: Enrico Manes, Feeding Hills, MA (US);
Connie E. Bird, Rocky Hill, CT (US);
Louis Chiappetta, Jr., South Windsor, CT (US)

(73) Assignee: GGODRICH CORPORATION, Charlotte, NC (US)

( * ) Notice: Subject to any disclaimer, the term of this patent is extended or adjusted under 35 U.S.C. 154(b) by 0 days.

(21) Appl. No.: 14/456,920

(22) Filed: Aug. 11, 2014

(65) Prior Publication Data

US 2016/0040740 A1 Feb. 11, 2016

(51) Int. Cl.
*F16F 9/10* (2006.01)
*F16F 9/53* (2006.01)

(52) U.S. Cl.
CPC .. *F16F 9/103* (2013.01); *F16F 9/53* (2013.01)

(58) Field of Classification Search
CPC ............ F16F 9/103; F16F 9/53; F16F 9/532; F16F 9/535; F16F 9/537
USPC ............ 188/269, 320, 267.1, 280, 267.2, 275
See application file for complete search history.

(56) References Cited

U.S. PATENT DOCUMENTS

| | | | |
|---|---|---|---|
| 5,396,973 A | 3/1995 | Schwemmer et al. | |
| 5,992,582 A | 11/1999 | Lou et al. | |
| 6,237,333 B1 | 5/2001 | Lee et al. | |
| 6,471,018 B1 | 10/2002 | Gordaninejad et al. | |
| 6,474,598 B2 | 11/2002 | Carter, Jr. | |
| 6,694,856 B1 | 2/2004 | Chen et al. | |
| 6,823,895 B2 | 11/2004 | Hitchcock et al. | |
| 6,926,500 B2 | 8/2005 | Ferullo | |
| 7,360,994 B2 | 4/2008 | Zoppitelli | |
| 7,720,582 B2 | 5/2010 | Makinadjian | |
| 7,896,019 B2 | 3/2011 | Bettin et al. | |
| 8,039,046 B2 | 10/2011 | Bingeman et al. | |
| 8,091,692 B2 | 1/2012 | Deshmukh et al. | |
| 8,220,740 B2 | 7/2012 | Cox et al. | |
| 8,393,446 B2 | 3/2013 | Haugen | |
| 8,413,772 B2 | 4/2013 | Wereley et al. | |
| 8,448,899 B2 | 5/2013 | Luce | |
| 2006/0231357 A1 | 10/2006 | Jolly et al. | |

(Continued)

FOREIGN PATENT DOCUMENTS

| | | |
|---|---|---|
| CA | 2348270 | 11/2001 |
| CA | 2789472 | 5/2013 |

(Continued)

OTHER PUBLICATIONS

J David Carlson, Critical Factors for MR fluids in vehicle systems, Lord Corporation, International Journal of Vehicle Design (2003), vol. 33, No. 1-3,pp. 207-217, 11, Inderscience Enterprises Ltd.

(Continued)

*Primary Examiner* — Melanie Torres Williams
(74) *Attorney, Agent, or Firm* — Snell & Wilmer L.L.P.

(57) ABSTRACT

A shock damper is disclosed. The shock damper may have a variable shear control apparatus through which a shear-thickening fluid may flow. In this manner, the shock damper may compress at different rates for different applied impulse forces, in response to the changing viscosity of the shear-thickening fluid.

18 Claims, 7 Drawing Sheets

(56) References Cited

U.S. PATENT DOCUMENTS

| | | | |
|---|---|---|---|
| 2007/0018037 A1 | 1/2007 | Perlo et al. | |
| 2010/0247856 A1 | 9/2010 | Vito et al. | |
| 2012/0166044 A1 | 6/2012 | Battlogg et al. | |
| 2012/0186922 A1* | 7/2012 | Battlogg ............... | B62K 25/04 188/267.1 |
| 2012/0292143 A1 | 11/2012 | Anderfaas et al. | |
| 2013/0061739 A1 | 3/2013 | Cheong et al. | |
| 2013/0119190 A1 | 5/2013 | Cox et al. | |

FOREIGN PATENT DOCUMENTS

| | | |
|---|---|---|
| CN | 101251163 | 6/2010 |
| CN | 102126563 | 12/2012 |
| CN | 103195858 | 7/2013 |
| EP | 05022809 | 9/1992 |
| EP | 1070110 | 1/2001 |
| EP | 1897609 | 5/2011 |
| EP | 2107004 | 12/2012 |
| EP | 2109374 | 6/2013 |
| GB | 2362699 | 3/2004 |
| GB | 2468863 | 9/2010 |
| JP | 1998226396 | 8/1998 |
| WO | 2007121422 | 10/2007 |
| WO | 2011083330 | 7/2011 |
| WO | 2013064218 | 5/2013 |
| WO | 2013088436 | 6/2013 |

OTHER PUBLICATIONS

G. Mikulowski; R. Leletty; M. Parafiniak, Adaptive Landing Gears for Improved Impact Absorption, Transport-Research and Innovation-European Commission, pp. 1-4.

James C. Poynor, Innovative Designs for Magneto-Rheological Dampers, Thesis, Aug. 7, 2001, pp. 1-96, Blacksburg, Virginia.

Sulakhe; Thakare; Aute, Review-MR Fluid and its Application, International Journal of Research in Aeronautical and Mechanical Engineering, Nov. 2013, vol. 1 Issue 7, pp. 125-133, ISSN(Online): 2321-3051.

University of Sheffield, Smart Fluids: Applications, Dynamics Research Group, pp. 1-3.

Batterbee; Sims; Stanway; Wolejsza, Magnetorheological Landing Gear Part 1: A Design Methodology, Smart Materials and Structures, pp. 1-33, White Rose Research Online, Universities of Leeds, Sheffield, and York.

Powell; Hu; Wereley, Magnetorheological fluid composites synthesized for helicopter landing gear applications, Journal of Intelligent Material Systems and Structures, University of MD, 2013, Originally Published Online Feb. 28, 2013, SAGE Publications, pp. 1-7.

Rowe, Subaru all wheel drive technology, Auto Resource, Internet auto guide, pp. 1-3.

Abhijit Majumdar, Development of soft composite materials with improved impact resistance using kevlar fabric and nano-silica based shear thickening, Materials and Design, (2013), pp. 295-300, vol. 54, Elsevier Ltd, Langford Lane, Kidlington, Oxford,United Kingdom.

Abhijit Majumdar et al., An Analysis of deformation and energy absorption modes of shear thickening fluid treated kevlar fabrics as soft body armour materials, Materials and Design, (2013), pp. 148-153, vol. 51, Elsevier Ltd, Langford Lane, Kidlington, Oxford,United Kingdom.

Louise A. Ahure et al., Behavior of Magnetorheological Fluid Composites Employing Carrier Fluids Certified for Landing Gear Use, 48th AIAA Aerospace Sciences Meeting Including the New Horizons Forum and Aerospace Exposition (2010), pp. 1-10.

Nadir Arada, Optimal control of evolutionary Quasi-Newtonian Fluids, SIAM Journal on Control & Optimization. 2013, vol. 51 Issue 3, p. 1940-1961. 22p.

Aditya Bandopadhyay et al., Steric-effect alterations in Streaming potential and energy transfer efficiency of non-newtonian fluids in narrow confinements, Langmuir (2011), vol. 27, No. 19, pp. 12243-12252, 58.

J. David Carlson, What makes a good MR fluid?, Lord Corporation, Journal of Intelligent Material Systems and Structures (Jul. 2002), vol. 3, No. 7-8, pp. 431-435, 8, SAGE Publications Ltd.

Chien-Yuan Hou, Behavior explanation and a new model for nonlinear viscous fluid dampers with a simple annular orifice, Archive of Applied Mechanics (Jan. 2012), vol. 82, No. 1, pp. 1-12,20, Springer Verlag, Tiergartenstrasse, Heidelberg,Germany.

Cortell, Suction, viscous dissipation and thermal radiation effects on the flow and heat transfer of a power-law fluid past an infinite plate, Chemical Engineering Research and Design (Jan. 2011), vol. 89, No. 1,pp. 85-93, 64, Institution of Chemical Engineers, Rugby, Warks., United Kingdom.

Evans, Shear thinning vs shear thickening in associating fluids, Journal of Chemical Physics. Jan. 22, 1998, vol. 108 Issue 4, p. 1570. 8p. 2 Charts., American Institute of Physics.

Iyer et al. Nonlinear damping for vibration isolation of microsystems using shear thickening fluid, Applied Physics Letters. Jun. 24, 2013, vol. 102 Issue 25, p. 251902. 4p. 1 Color Photograph, 1 Diagram, 2 Graphs., AIP Publishing LLC.

Weifeng Jiang, Stress pulse attention in shear thickening fluid, Appl Phys Lett (Mar. 11, 2013), vol. 102, No. 10, American Institute of Physics, NY 11747-4502, Melville, United States of America.

Xia Xing Zhou et al., Mechanical Properties and Rheological behavior of injection moulded foaming bamboo power-polypropylene composite, Applications of Engineering Materials (2011), vol. 287-290, pp. 1980-1986, Trans Tech Publications, Clausthal-Zellerfeld, Germany.

Jong Lyoul Park et al., Ballistic Performance of p-aramid fabrics impregnated with shear thickening fluid; part 1—effect of laminating sequence, Textile Research Journal (Apr. 2012), vol. 82, No. 6, pp. 542-557, SAGE Publications Ltd, London,United Kingdom.

Bok-Won Lee et al., Computational analysis of shear thickening fluid impregnated fabrics subjected to ballistic impacts, Advanced Composite Materials (2012), vol. 21, No. 2, pp. 177-192, Taylor and Francis Ltd., Oxfordshire, United Kingdom.

Liang-Liang Sun et al., Application of shear thickening fluid in ultra high molecular weight polyethylene fabric, J. Appl. Polym. Sci. (Aug. 15, 2013), vol. 129, No. 4, pp. 1922-1928, John Wiley and Sons Inc., NJ,Newark, United States of America.

E.V. Lomakin et al., Investigation of impact resistance of multilayered woven composite barrier impregnated with the shear thickening fluid, Archive of Applied Mechanics (Dec. 2011), vol. 81, No. 12, pp. 2007-2020, Springer Verlag, Tiergartenstrasse 17, D-69121, Heidelberg,Germany.

Liu et al., Semi-active vibration control of landing gear using megneto-Rhelological Dampers, SAE International Journal of Aerospace (Nov. 2011), vol. 4, No. 2,pp. 958-964, SAE International, PA, United States of America.

Paciello, Smart sensing and smart material for smart automotive damping, IEEE Instrum Meas Mag (2013), vol. 16, No. 5, pp. 24-30, Institute of Electrical and Electronics Engineers Inc., NJ, Piscataway, United States of America.

Jong Lyoul Park et al., Ballistic performance of p-aramid fabrics impregnanted with shear thickening fluid; part II-effect of fabric count and shot location, Textile Research Journal (Apr. 2012), vol. 82, No. 6, pp. 542-557, SAGE Publications Ltd, London,United Kingdom.

Suresh Kumar Patel, et al. Interfacial stress in non-newtonian flow through packed bed, Powder Technology (Jul. 2011), vol. 211, No. 1, pp. 127-134, Elsevier, Amsterdam, Netherlands.

Qin Sun et al., Controllable study of electro-rheological fluid applied to landing gear bumper, ICAS-Secretariat—25th Congress of the International Council of theAeronautical Sciences 2006, vol. 6, pp. 3635-3639, Curran Associates Inc., NY, RedHook, United States of America.

Robert Rabb et al., Simulation of large fragment impacts on shear-thickening fluid kevlar fabric barriers, Journal of Aircraft (Nov. 2011), vol. 48, No. 6, pp. 2059-2067, American Institute of Aeronautics and Astronautics Inc., VA Reston, UnitedStates of America.

S. Santos De Oliveira et al., Alignment of particles in sheared viscoelastic fluids, Journal of Chemical Physics. Sep. 14, 2011, vol. 135 Issue 10, p. 104902. 13p., American institute if Physics, 2013.

(56) References Cited

OTHER PUBLICATIONS

Shivaram, Smart actuators to improve sportiness of a luxury car by deploying additional suspension stiffness on-demand, International Journal of Vehicle Design. 2012, vol. 60 Issue 1/2, p. 155-175. 21p., Interscience publishers.

Mathieu Soutrenon et al., Structural damping using encapsulated shear thickening fluids, Active and Passive Smart Structures and Integrated Systems 2012,vol. 8341, var.pagings, SPIE, WA , Bellingham, United States of America.

Ankita Srivastava, Improving the impact resistance performance of kevlar fabrics using silica based shear thickening fluid, Materials Science and Engineering A (Nov. 2011), vol. 529, No. 1, pp. 224-229, Elsevier Ltd, Langford Lane, Kidlington, Oxford,United Kingdom.

T.F. Tian et al., Study of shear-stiffened elastomers, AIP Conference Proceedings (2013), vol. 1542, p. 133-136, American Institute of Physics, USA Conference: Powders and Grains 2013: 7th International Conference on Micromechanics of Granular Media, Sydney, NSW, Australia.

Tongfei Tian et al., Study of the temperature effect of shear thickening fluid, 2013 IEEE/ASME International Conference on Advanced Intelligent Mechatronics, Jul. 2013, p. 833-837, IEEE, Piscataway, NJ, USAConference: 2013 IEEE/ASME International Conference on Advanced Intelligent Mechatronics (AIM), Wollongong, NSW, Australia, Jul. 9-12, 2013Sponsor(s): IEEE Ind. Electron. Soc.

M. Turkyilmazoglu, Exact soultions for the imcompressible viscous fluid of a porous rotating disk flow, International Journal of Non-Linear Mechanics (May 2009), vol. 44,No. 4, pp. 352-357, Elsevier Ltd, Langford Lane, Kidlington, Oxford,United Kingdom.

Norman M. Wereley, Nondimensional herschel-bulkley analysis of magnetorheological and electrorheological dampers, Journal of Intelligent Material Systems & Structures. Mar. 2008, vol. 19 Issue 3, p. 257-268.

Xu Yulei, Evolution of the initial hole in vertically vibrated shear thickening fluids, Physical Review E—Statistical, Nonlinear, and Soft Matter Physics (May 11, 2011), vol. 83, No. 5, American Physical Society, One Physics Ellipse, MD20740-3844, College Park, United States of America.

Zhang et al. , Experimental study on damping characteristics of the two magneto-rheological fluid damper with disc type orifice vehicle, Binggong Xuebao/Acta Armamentarii (Nov. 2009), vol. 30, No. 11, pp. 1488-1492, China Ordnance Society, Beijing,China.

Zhenqian LU et al., Compressive behaviors of warp-knitted spacer fabrics impregnated with shear thickening fluid, Compos. Sci. Technol. (Nov. 14, 2013), vol. 88, pp. 184-189, Elsevier Ltd, Langford Lane, Oxford,United Kingdom.

Hao Jun Zhou et al., Experimental Analysis and performance evaluation of magnetorheological damper under high impact load, Advanced Materials Research (2009), vol. 79-82, pt.2, p. 1387-1390, Trans Tech Publications Ltd., Switzerland.

Zhou Hong et al., Study on the Performance of shear thickening fluid and a damper as its application, JVibShock (Sep. 28, 2013), vol. 32, No. 18, pp. 15-20, Chinese Vibration Engineering Society, 121 Nanjiang Lu, 200011, Shanghai, China.

* cited by examiner

SHOCK DAMPER

FIELD

The present disclosure relates to dampers (shock absorbers), and, more specifically, to a shear thickening damper for landing gear.

BACKGROUND

Aircraft landing gear often have shock-absorbing dampers to cushion landing and ground operations. Landing gear often must absorb significant energy during landings, yet also provide firm ground handling during lower speed operations, such as taxiing. Often, however, a shock-absorbing damper that provides firm ground handling at lower speed operations is not ideal for absorbing significant energy during landings, and vice-a-versa.

SUMMARY

A shock damper is disclosed. The shock damper may have a cylinder, a piston housed at least partially radially within the cylinder, and a variable shear control apparatus housed at least partially radially within the cylinder. The variable shear control apparatus may have a first orifice, a second orifice, and a shear path disposed between the first orifice and the second orifice. A shear-thickening fluid may travel through the shear path in response to the piston at least one of extending or compressing.

A method of operating a shock damper is disclosed. The method may include translating a variable shear control apparatus having a first orifice and a shear path in response to a piston at least one of extending or contracting, directing a shear-thickening fluid into the first orifice and through the first shear path in response to the translating, varying a viscosity of the shear-thickening fluid in response to the directing, and damping the at least one extending or retracting in response to the varying.

BRIEF DESCRIPTION OF THE DRAWINGS

The subject matter of the present disclosure is particularly pointed out and distinctly claimed in the concluding portion of the specification. A more complete understanding of the present disclosure may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably.

The present disclosure relates to landing gear components, and more particularly, to a shock damper. Aspects of the disclosure herein may be applicable to other vehicles and applications, such as an automobile shock absorber, a seat isolation damper, and/or any application of shock damping. In general, a landing gear includes a shock damper that reacts to the compression and extension impulses exerted by the variation in shock damper extension, such as those occurring during the impact of the aircraft onto the ground when landing. Particularly, helicopter landing gear undergoes a compressive event upon landing. In the event of an autorotation, or other abrupt ground impact event, the compressive event may occur more abruptly, or the acceleration to be reacted by the landing gear may be greater than typical. Thus, there is a need for a landing gear damper which can adapt to provide different degrees of damping (e.g., react with different quantities of force applied with different acceleration) over different lengths of extension/compression, in response to different impact conditions. A landing gear may be desired to react stiffly and/or compress a lesser distance for a given force over time (when a rapid impulse is applied), such as in an autorotation landing, whereas, a landing gear may be desired to react softly and to compress a greater distance for a second force over time (when a less rapid impulse is applied), such as in a typical landing wherein the loading is transferred from the rotors to the landing gear more gradually than in an autorotation landing.

Figure 2:
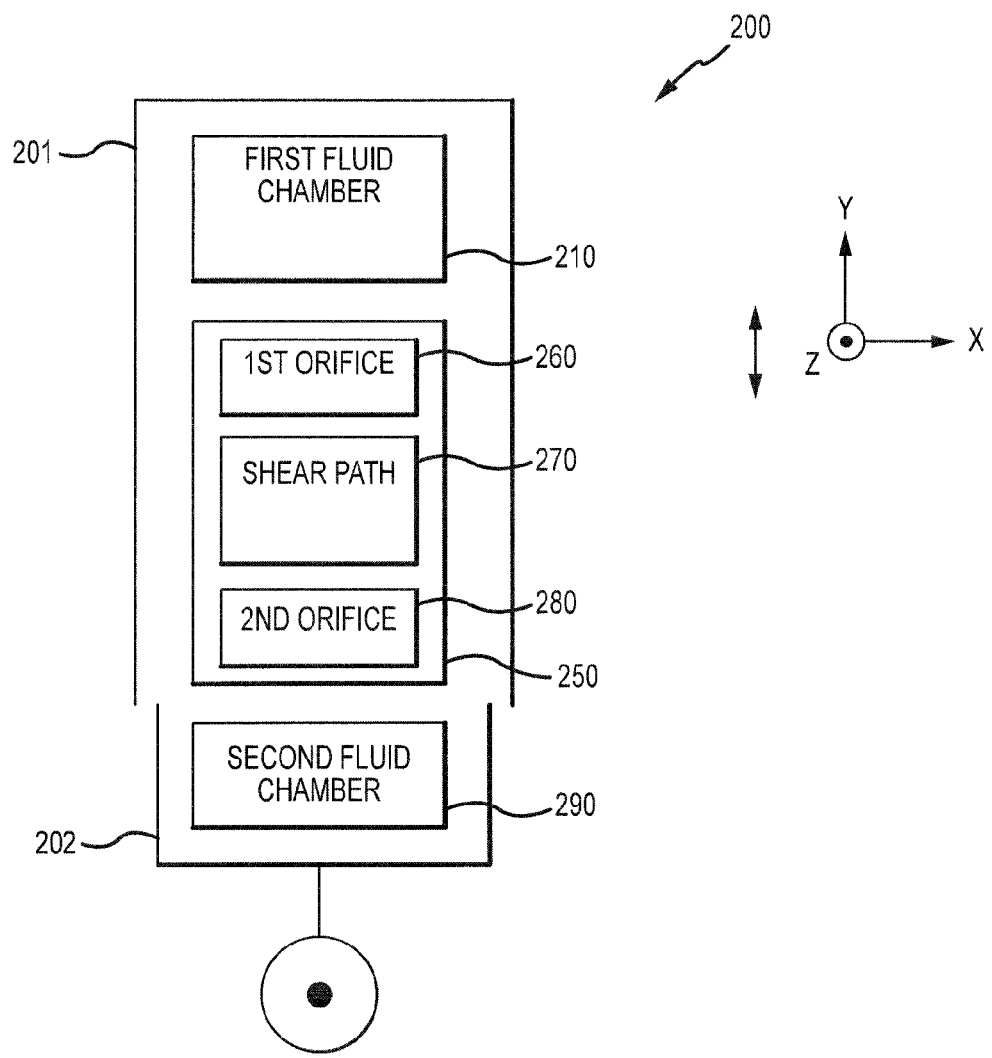
FIG. 2 illustrates a block diagram of a shear thickening damper, according to various embodiments.

In accordance with various embodiments, a shock damper 200 is shown in FIG. 2. The shock damper 200 may be used in aerospace applications. Generally, a shear thickening fluid ("STF") at least partially fills the shock damper 200, for example, at least partially filling the first fluid chamber 210 and/or the second fluid chamber 290.

In various embodiments, a shock damper 200 may comprise a cylinder 201 and a piston 202. The piston 202 may be configured to translate into ("instroke") and out ("outstroke") the cylinder 201 (collectively, to "stroke"). As the shock damper 200 strokes, fluid (liquid and/or gas, including an STF) is transferred among various chambers, for example, the first fluid chamber 210 and the second fluid chamber 290, traveling through the variable shear control apparatus 250, absorbing the energy imparted by the stroking, due to friction and viscosity of the fluid. In various embodiments, the energy is also absorbed due to reaction forces resulting from the compression of a gas or spring or another mechanism for returning the piston to an unloaded position relative to the cylinder.

The piston 202 may be disposed radially inward of the cylinder 201 and may travel axially within the cylinder 201. As the piston 202 travels axially within the cylinder 201, the shock damper 200 may enter various operating regions of FIG. 1, where a fluid disposed within the shock damper 200 behaves in various ways. As FIG. 1 illustrates, in various embodiments, the relationship between compressive impulse (e.g., shear rate) and STF viscosity is nonlinear and may comprise one or more inflection points as piston 202 travels within cylinder 201 in response to different magnitudes of forces, and different accelerations.

Figure 1:
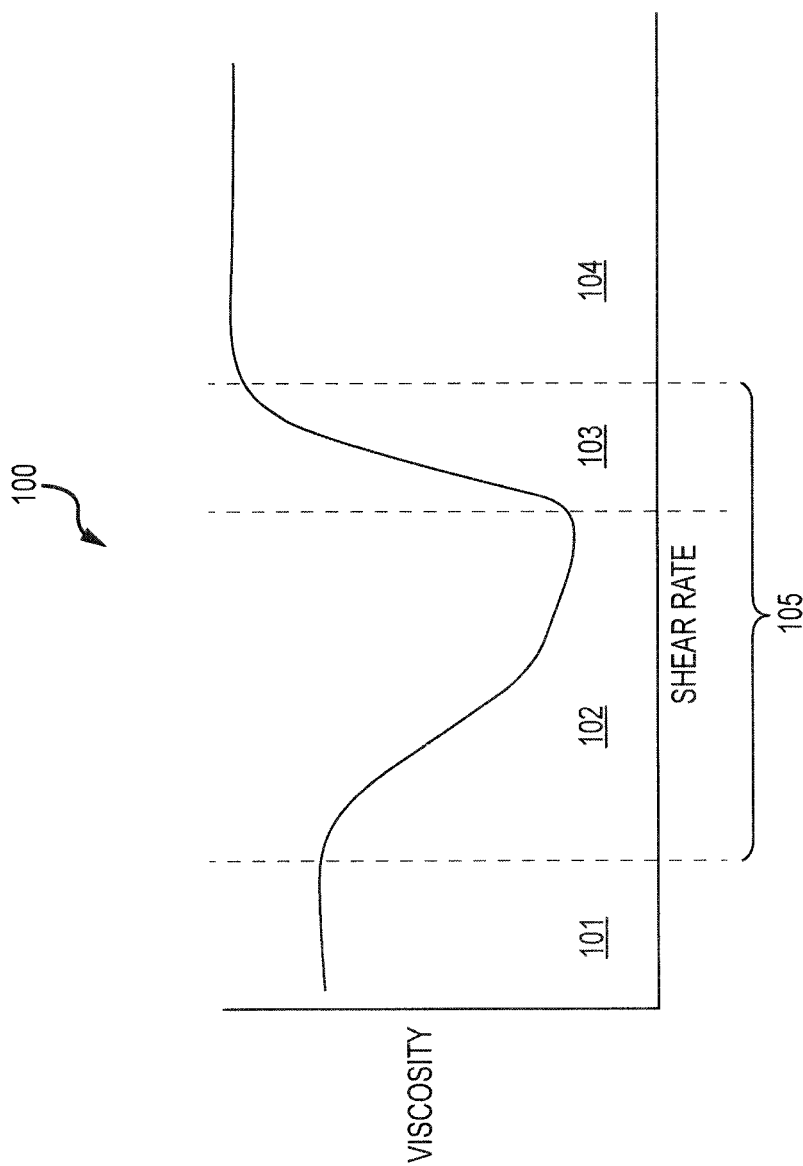
FIG. 1 illustrates a graph showing various stages of operation of a shear thickening fluid used in a shear damper, in accordance with various embodiments.

In accordance with various embodiments, the behavior of an exemplary shear thickening fluid is shown in FIG. 1. A shear thickening fluid ("STF") may be a non-Newtonian fluid. The shear thickening fluid may comprise a colloidal dispersion, for example, having condensed polymers, oxides, and/or metals suspended in a liquid, such as a hydraulic oil, water, or other formulations. The viscosity of the STF may be a function of applied shear stress (e.g. the "viscosity curve"). The viscosity of the STF may also be a function of other influences, such as electric fields. The volume fraction of particles dispersed within the liquid distinguishes the viscosity curve of different STFs.

The viscosity of the STF changes in response to the applied shear stress. At rest and under weak applied shear stress, a STF may have a constant viscosity because the random distribution of particles (e.g., due to Brownian motion) causes the particles to frequently collide. However, as a greater shear stress is applied so that the shear rate increases, the particles flow in a more streamlined manner. However, as an even greater shear stress is applied so that the shear rate increases further, a hydrodynamic coupling between the particles may overcome the interparticle forces responsible for Brownian motion. The particles may be driven closer together, and the microstructure of the colloidal dispersion may change, so that particles cluster together in hydroclusters.

The viscosity curve of the STF can be fine-tuned through changes in the characteristics of the suspended particles. For example, the particles' shape, surface chemistry, ionic strength, and size affect the various interparticle forces involved, as does the properties of the suspending medium. However, in general, hydrodynamic forces dominate at a high shear stress, which also makes the addition of a polymer brush attached to the particle surface effective in limiting clumping in hydroclusters. Various factors influence this clumping behavior, including, fluid slip, adsorbed ions, surfactants, polymers, surface roughness, graft density (of a grafted polymer brush), molecular weight, and solvent, so that the onset of shear thickening can be tuned. In general, the onset of shear thickening can be delayed by the introduction of techniques to prevent the clumping of particles.

Thus, with reference to FIG. 1, an example viscosity curve 100 of an STF is illustrated. Curve 100 illustrates that as the shear rate increases, the viscosity of an STF first travels through a nominal equilibrium region 101, then enters a microstructure transition region 105 wherein the relative dominance of hydrodynamic forces versus interparticle forces changes, and eventually, a shear-thickened equilibrium region 104 wherein hydrodynamic forces dominate over interparticle forces. In various embodiments, the shear-thickened equilibrium region 104 comprises a greater viscosity than the nominal equilibrium region 101.

The microstructure transition region 105 comprises a shear-thinning region 102 and a shear-thickening region 103. As the particles flow in a more streamlined manner in response to the increasing shear rate, the viscosity of the STF decreases (shear-thinning region 102), until the particles begin clustering, so that the viscosity of the STF increases (shear-thickening region 103). In various embodiments of a shock damper 200, a STF is selected so that the shock damper 200 typically operates within one or more regions (nominal equilibrium region 101, shear-thinning region 102, shear-thickening region 103, and/or shear-thickened equilibrium region 104). Various embodiments are configured so that the STF operates primarily within the shear-thickening region 103 of the microstructure transition region 105, so that the damper becomes "stronger" (e.g., the viscosity of the STF increases, so that the damper can absorb more energy over a given compression distance and/or react to greater forces over a given compression distance) in response to greater shear rates (e.g., a harder landing or more rapid than typical deceleration event).

With renewed reference to FIG. 2, and continuing reference to FIG. 1, the piston 202 may translate a first distance in a given amount of time in response to a first compression impulse in the shear-thinning region 102, and may translate a second distance in a given amount of time in response to a second compression impulse in the shear-thickening region 103. The ratio of the second compression impulse to the second translation distance may be greater than the ratio of the first compression impulse to the first translation distance. Stated another way, the amount of energy reacted per unit of shock damper 200 length may vary from region to region of curve 100. For example, during sudden compression of the shock damper 200, the shock damper 200 may operate within shear-thickening region 103, so that the amount of energy absorbed per length of shock damper 200 compression may increase progressively, ameliorating the impulse loading on various landing gear components without the damper "bottoming out" or failing.

Figure 3:
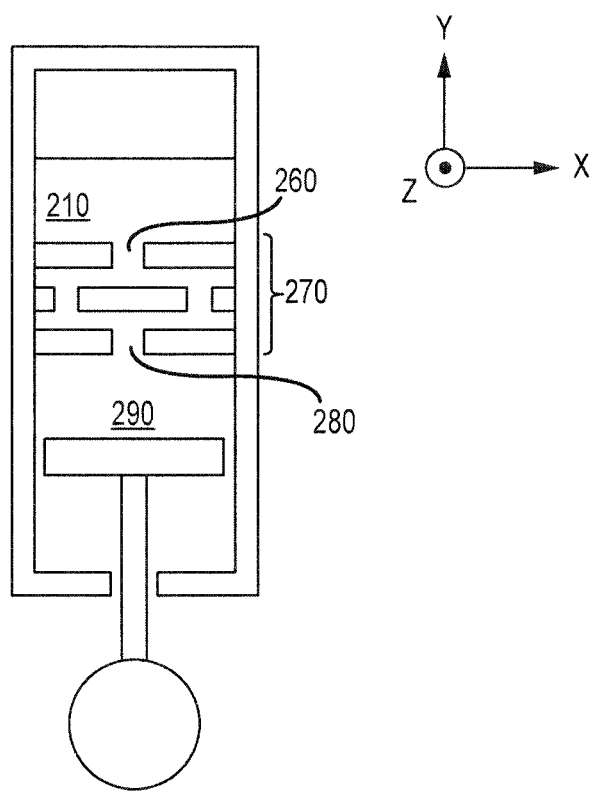
FIG. 3 illustrates a variable shear control apparatus of a shear thickening damper according to various embodiments.

With reference to FIGS. 2 and 3, the shock damper 200 may further comprise various components. For example, the shock damper 200 may comprise a first fluid chamber 210 and a variable shear control apparatus 250 disposed in fluid communication with the first fluid chamber 210. The shock damper 200 may comprise a second fluid chamber 290 disposed in fluid communication with the variable shear control apparatus 250. As previously discussed, a STF may travel between the first fluid chamber 210 and the second fluid chamber 290 through the variable shear control apparatus 250. More particularly, the variable shear control apparatus 250 may travel axially within the cylinder 201, as it may be in fixed mechanical connection to the piston 202. As the variable shear control apparatus 250 travels axially within the cylinder 201, the available volume in the first fluid chamber 210 and the second fluid chamber 290 changes, depending on the position of the variable shear control apparatus 250. A fixed volume of STF may be contained within the first fluid chamber 210 and/or the second fluid chamber 290. As a result, the STF must travel through the variable shear control apparatus 250, as the variable shear control apparatus 250 travels axially within the cylinder 201. Depending on the instantaneous viscosity of the STF, the STF interacts with the variable shear control apparatus 250 with greater or lesser frictional resistance. The force communicated from the piston 202 to the variable shear control apparatus 250 is reacted on the variable shear control apparatus 250 by the STF, damping the acceleration of the shear control apparatus 250, and thus, damping the acceleration of the piston 202.

In various embodiments, the variable shear control apparatus 250 may comprise a first orifice 260, a shear path 270, and a second orifice 280. The first orifice 260 and the second orifice 280 may be apertures disposed at opposite ends of a shear path 270. A STF may enter the through the first orifice 260, travel through the shear path 270, and exit through the second orifice 280. Alternatively, a STF may enter through the second orifice 280, travel through the shear path 270, and exit through the first orifice 260. In various embodiments, the first orifice 260 comprises an aperture in fluidic communication with the first fluid chamber 210. Moreover, the second orifice 280 may comprise an aperture in fluidic communication with the second fluid chamber 290. In this manner, the STF from the first fluid chamber 210 may enter and exit the shear path 270 via the aperture comprising the first orifice 260. Similarly, the STF from the second fluid chamber 290 may enter and exit the shear path 270 via the aperture comprising the second orifice 280. The shear path 270 may comprise a passageway disposed between the first orifice 260 and the second orifice 280, connecting the two orifices in fluidic communication. In further embodiments, a STF may enter through any of multiple orifices and travel through any of multiple shear paths under various loading conditions. For example, different orifices and/or different shear paths may be utilized in response to different loads.

The shear path 270 may comprise a path length, a path shape, and a path diameter. Similarly, the first orifice 260 may comprise a first shape and a first diameter, and the second orifice 280 may comprise a second shape and a second diameter. These different properties may affect the tendency of the STF to behave in different ways. For example, a smaller path diameter and/or first diameter and/or second diameter may increase the shear rate (FIG. 1) exerted on the STF for a given impact scenario, versus a larger path diameter and/or first diameter and/or second diameter. In various embodiments, the path diameter, first diameter, and second diameter are equal and are selected to cause the STF to operate primarily in the shear-thickening region (see 103; FIG. 1) under given operating conditions. In further embodiments, one or more of the path diameter, first diameter, and/or second diameter may be different.

The path shape, first shape, and second shape may also be selected to affect the tendency of the STF to behave in different ways. For example, as the STF thickens, a boundary layer forms at the solid-liquid interface of various shock damper 200 components. In various embodiments, a narrow shape, such as a compressed oval, may cause a boundary layer formed at two different portions of the path shape, first shape, and/or second shape to intersect, thereby restricting the flow rate of STF through the shear path 270 and/or the first orifice 260 and/or the second orifice 280.

Moreover, the path length may be selected with the same considerations. Furthermore, the path length may be selected in view of additional considerations, for example, in view of the desired surface area of the solid-liquid interface of the shear path 270 and the STF. A path length causing the shear path 270 to have a greater surface area, causes the variable shear control apparatus 250 to experience a greater load in response to a given STF viscosity, because the shear path 270 has more area of contact upon which to react a force.

Figure 4A:
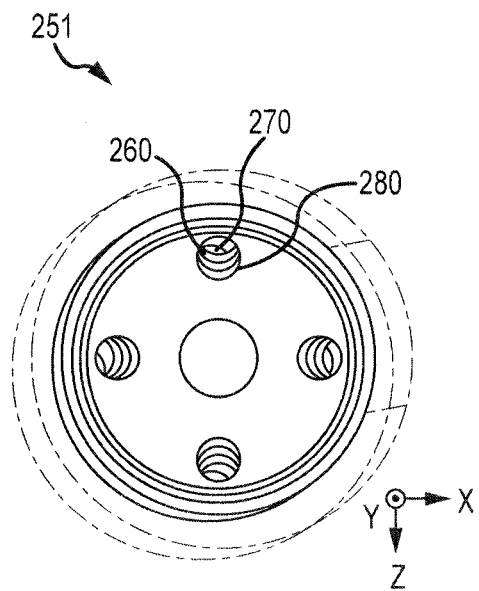
FIGS. 4A-B illustrate a variable shear control apparatus of a shear thickening damper having a shock shim stack according to various embodiments.
Figure 4B:
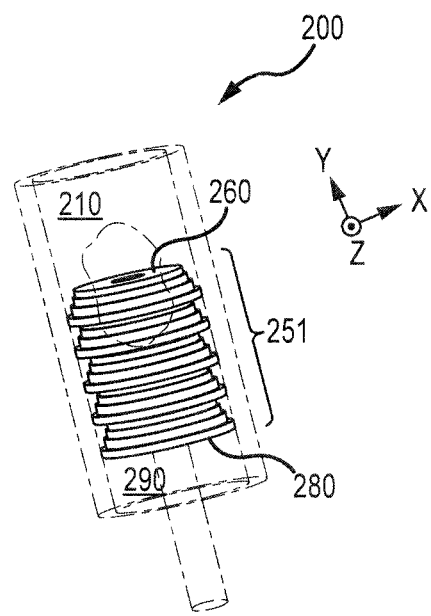

With reference now to FIG. 4A-B, an example variable shear control apparatus 250 is disclosed. In various embodiments, a variable shear control apparatus 250 comprises a shock shim stack 251. A first orifice 260 is disposed at the interface of the shock shim stack 251 and the first fluid chamber 210, and a second orifice 280 is disposed at the interface of the shock shim stack 251 and the second fluid chamber 290. Through the shock shim stack 251, a shear path 270 extends between the first orifice 260 and the second orifice 280. Because the shear path 270 is routed through the shims comprising the shock shim stack 251, the shims cause the path length and path shape to change in response to the deflection of the shock shim stack 251. In this manner, combinations of different shims and/or spacers may affect the flow path to alter the parameters of interest, such as the path length, the path shape, the first shape, the second shape, the first diameter, the second diameter, and the path diameter, further tuning the behavior of the shock damper 200 by changing the surface area of the variable shear control apparatus 250 in contact with the STF, and by changing the local shear rate of the STF through the various diameters and shapes of various portions of the variable shear control apparatus 250. Moreover, in further embodiments, any mechanism configured alter the geometry of the flow path to affect the parameters of interest may be implemented.

Figure 5A:
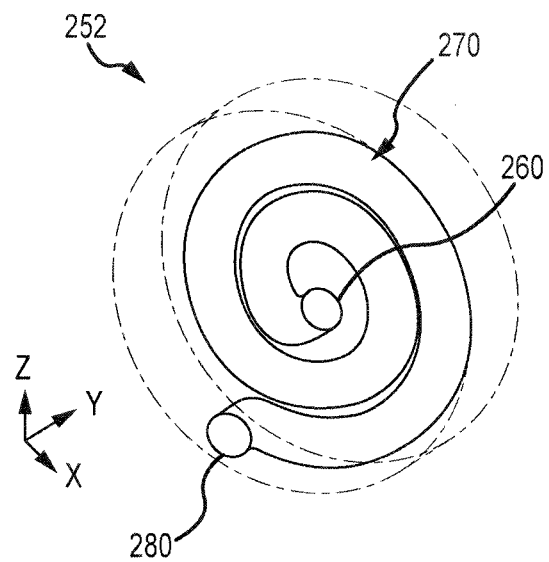
FIGS. 5A-B illustrate a variable shear control apparatus of a shear thickening damper having a shear puck according to various embodiments.
Figure 5B:
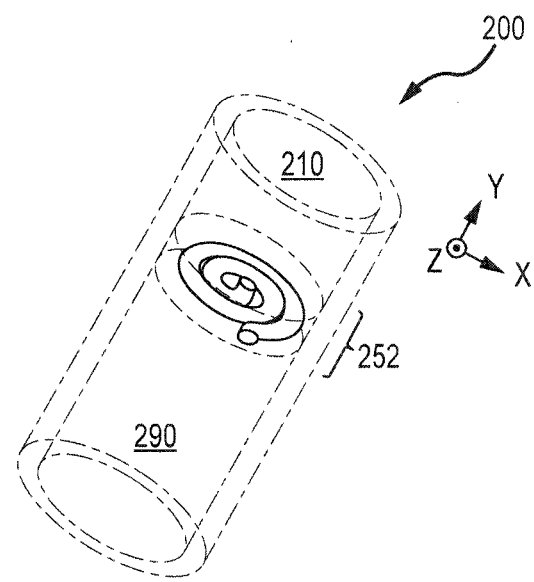

With reference now to FIG. 5A-B, a further example variable shear control apparatus 250 is disclosed. In various embodiments, a variable shear control apparatus 250 comprises a shear puck 252. A first orifice 260 is disposed at the interface of the shear puck 252 and the first fluid chamber 210, and a second orifice 280 is disposed at the interface of the shear puck 252 and the second fluid chamber 290. Through the shear puck 252, a shear path 270 extends between the first orifice 260 and the second orifice 280. Because the shear path 270 is routed through the shear puck 252, a circuitous shear path 270 may be designed, for example, a spiral curve. In this manner, the path length and path shape may be selected to affect the parameters of interest, further tuning the behavior of the shock damper 200 by changing the surface area of the variable shear control apparatus 250 in contact with the STF, and by changing the local shear rate of the STF through the various portions of the variable shear control apparatus 250.

With reference to FIGS. 2-5B, various different aspects of various embodiments may be combined. For example, various aspects of a shear puck 252 and a shock shim stack 251 may be combined in further embodiments of a variable shear control apparatus 250. For example, a shock shim stack 251 may comprise a shear path 270 following a circuitous route similar to that illustrated with reference to the shear puck 252. Moreover, a variable shear control apparatus 250 may comprise both a shock shim stack 251 and a shear puck 252.

In further embodiments, check valves may be implemented, each comprising a ball and a spring. The spring may be have a scalar spring constant, or may have a spring constant that is a function of spring deflection, so that the flow path may be affected in order to alter the parameter of interest, for example, by selectively closing and opening different flow paths, or by changing the size of apertures, for instance, first orifice 260 and/or second orifice 280 in response to different STF viscosities, and different applied forces, or different accelerations.

Now, having described various components of various exemplary shock damper systems, a shock damper may be manufactured from various materials. In an exemplary embodiment, a shock damper system may comprise metal. For example, a shock damper may comprise metal, such as titanium, aluminum, steel, or stainless steel, though it may alternatively comprise numerous other materials configured to provide support, such as, for example, composite, ceramic, plastics, polymers, alloys, glass, binder, epoxy, polyester, acrylic, or any material or combination of materials having a desired strength, stiffness, or flexibility sufficient to maintain resiliency during use. In various embodiments, various portions of shock damper systems as disclosed herein are made of different materials or combinations of materials, and/or may comprise coatings.

In various embodiments, a shock damper may comprise multiple materials, or any material configuration suitable to enhance or reinforce the resiliency and/or support of the shock damper when subjected to wear in an aircraft operating environment or to satisfy other desired electromagnetic, chemical, or physical properties, for example radar signature, load capacity, stroke length, rigidity, or heat tolerance.

In various embodiments, while the shock dampers described herein have been described in the context of aircraft applications; however, one will appreciate in light of the present disclosure, that the shock struts described herein may be used in connection with various other vehicles, for example, cars, trucks, busses, trains, boats, and submersible vehicles, or any other vehicle or device, having a shock damper.

While various example shock dampers has been discussed herein having a piston radially within a cylinder, in various embodiments, the cylinder may not comprise a circular profile, but may instead comprise a trapezoidal profile, or a triangular profile, or may comprise any shape. Similarly, the piston may comprise any corresponding shape and may be disposed within the cylinder, for example, having a profile with a lesser perimeter length than that of the profile of the cylinder.

Figure 6:
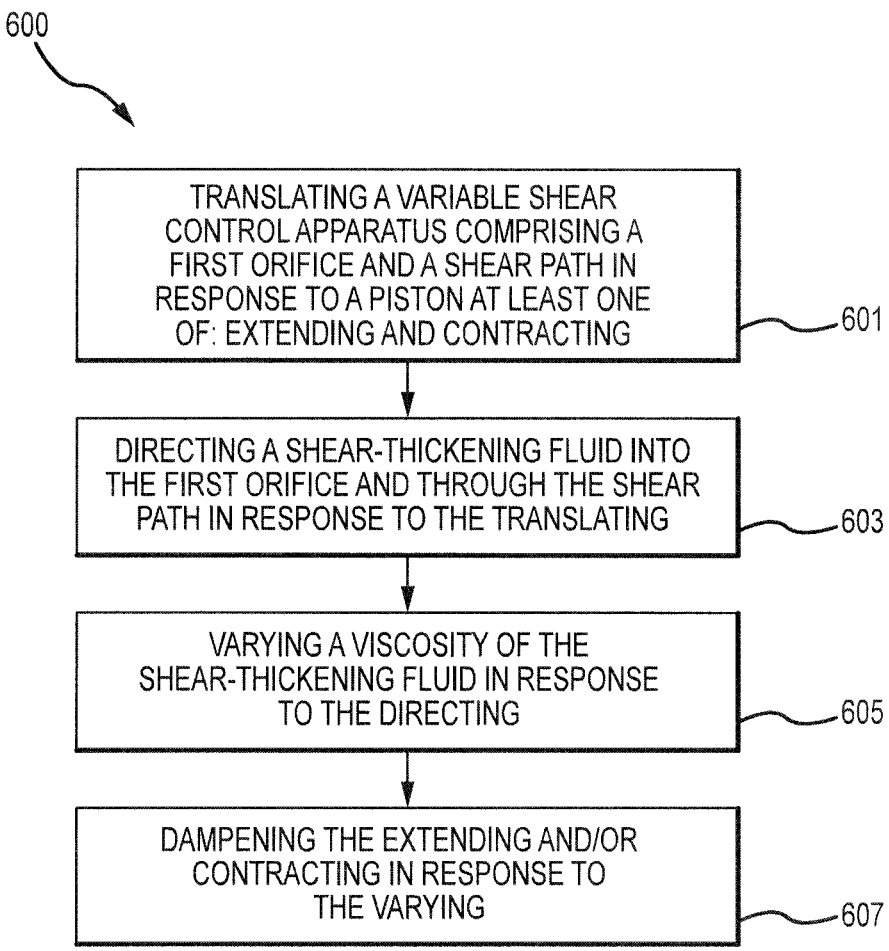
FIG. 6 illustrates an exemplary method of operating a shear thickening damper according to various embodiments.
Figure 7:
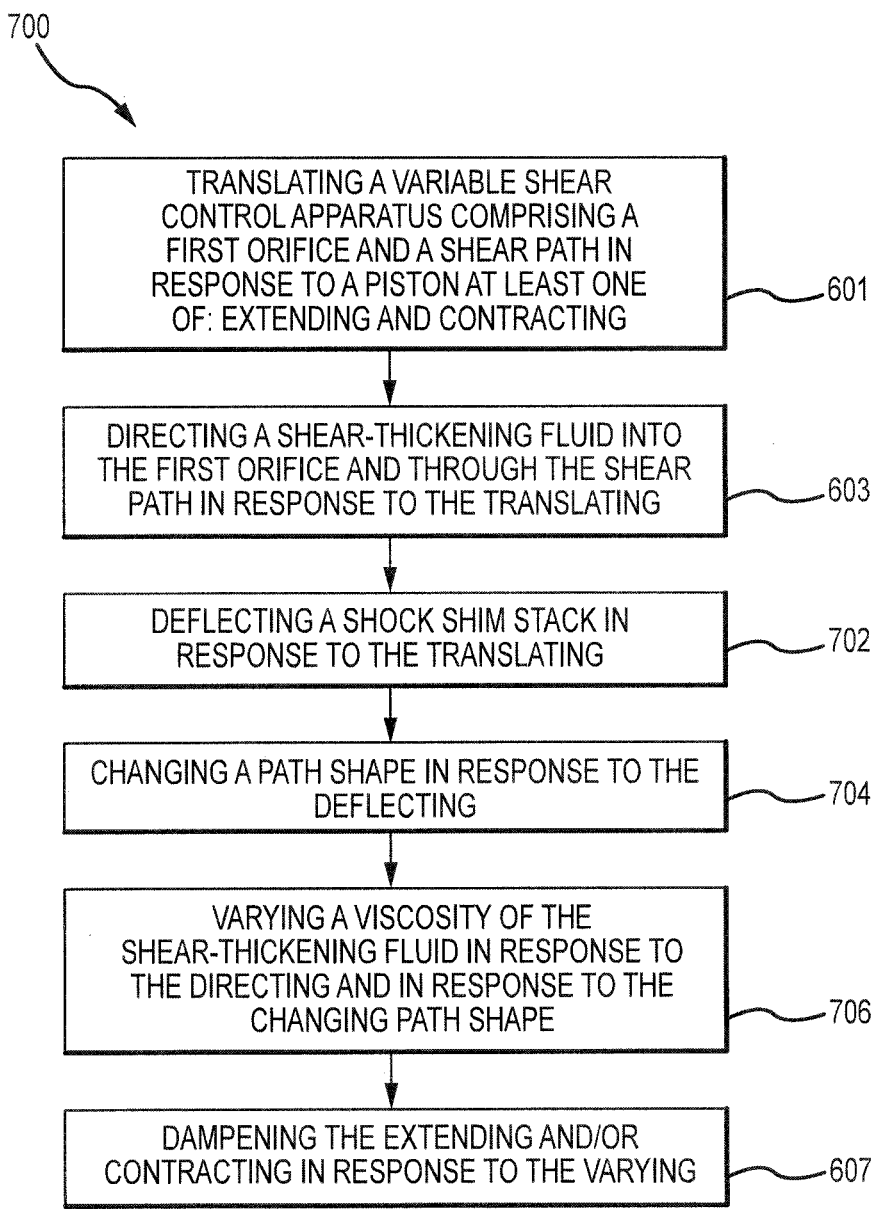
FIG. 7 illustrates an exemplary method of operating a shear thickening damper having a shock shim stack according to various embodiments.

With reference to FIGS. 2 and 6, a method 600 of operating a shock damper may be provided. The method may include translating a variable shear control apparatus 250 comprising a first orifice 260 and a shear path 270 in response to a piston 202 at least one of extending or contracting (Step 601). A shear-thickening fluid may be directed into the first orifice 260 and through the shear path 270 in response to the translating (Step 603). In response to the directing, a viscosity of the shear-thickening fluid may be varied (Step 605). Consequently, the extending and/or contracting may be dampened in response to the varying (Step 607).

With reference to FIGS. 2, 4A-B, and 7, a method 700 of operating a shock damper having a shock shim stack 251 comprising a path shape may also be contemplated. This method may include translating a variable shear control apparatus 250 comprising a first orifice 260 and a shear path 270 in response to a piston 202 at least one of extending or contracting (Step 601). A shear-thickening fluid may be directed into the first orifice 260 and through the shear path 270 in response to the translating (Step 603). The shock shim stack 251 may be deflected in response to the translating, as well (Step 702), thus changing the path shape in response to the deflecting (Step 704). In response to the directing, as well as in response to the changing path shape, a viscosity of the shear-thickening fluid may be varied (Step 706). Consequently, the extending and/or contracting may be dampened in response to the varying (Step 607). In further embodiments, the variable shear control apparatus may be non-translatable, for example, fixed to a piston and thus, fluid may be directed into the first orifice 260 and through the shear path 270 in response to translating of other system components, such as the piston (and/or cylinder) rather than the variable shear control apparatus.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A shock damper comprising:
   a cylinder;
   a piston housed at least partially radially within the cylinder;
   a variable shear control apparatus housed at least partially radially within the cylinder, the variable shear control apparatus comprising:
      a first orifice;
      a second orifice; and
      a shear path disposed between the first orifice and the second orifice; and
   a shear puck, wherein the shear path is disposed within the shear puck, and
   wherein a shear-thickening fluid travels through the shear path in response to the piston at least one of extending or compressing.

2. The shock damper according to claim 1, wherein the cylinder comprises a first chamber in fluid communication with the first orifice; and the piston is in fixed mechanical communication with the variable shear control apparatus and comprising a second chamber in fluid communication with the second orifice.

3. The shock damper according to claim 1, wherein the shear path comprises a path shape comprising a spiral.

4. The shock damper according to claim 1, wherein the shear-thickening fluid is selected to operate in a shear-thickening region in response to the piston at least one of extending or compressing.

5. The shock damper according to claim 1, wherein the shear-thickening fluid is selected to operate in at least two of a shear-thickening region, a shear-thinning region, or a nominal equilibrium region in response to the piston at least one of extending and compressing.

6. The shock damper according to claim 1, wherein the shear-thickening fluid comprises a colloidal dispersion comprising:
   a liquid; and
   a plurality of particles, wherein each particle comprises at least one of a condensed polymer, an oxide, or a metal suspended in the liquid,
   wherein a viscosity of the shear-thickening fluid is a function of an applied shear stress.

7. The shock damper according to claim 6, wherein each of the particles further comprises a grafted polymer brush.

8. A method of operating a shock damper comprising:
   translating a variable shear control apparatus comprising a first orifice and a shear path in response to a piston at least one of extending or contracting,
   wherein the shear path is disposed within a shock shim stack and comprises a path shape;
   deflecting the shock shim stack in response to the translating;
   changing the path shape in response to the deflecting; and
   directing a shear-thickening fluid into the first orifice and through the shear path in response to the translating;
   varying a viscosity of the shear-thickening fluid in response to the directing;
   varying the viscosity of the shear-thickening fluid further in response to the changing the path shape; and
   damping the at least one extending and retracting in response to the varying.

9. The method of operating the shock damper according to claim 8, further comprising:
   directing the shear-thickening fluid out a second orifice in response to the translating.

10. The method of operating the shock damper according to claim 8, wherein the varying further comprises increasing the viscosity of the shear-thickening fluid.

11. The method of operating the shock damper according to claim 8, wherein the varying further comprises decreasing the viscosity of the shear-thickening fluid.

12. A shock damper comprising:
    a cylinder;
    a piston housed at least partially radially within the cylinder;
    a variable shear control apparatus housed at least partially radially within the cylinder, the variable shear control apparatus comprising:
      a first orifice;
      a second orifice; and
      a shear path disposed between the first orifice and the second orifice; and
    a shock shim stack, wherein the shear path is disposed within the shock shim stack, and
    wherein a shear-thickening fluid travels through the shear path in response to the piston at least one of extending or compressing.

13. The shock damper according to claim 12, wherein
    the cylinder comprises a first chamber in fluid communication with the first orifice; and
    the piston is in fixed mechanical communication with the variable shear control apparatus and comprising a second chamber in fluid communication with the second orifice.

14. The shock damper according to claim 13, wherein the shear path comprises a path shape that changes in response to a deflection of the shock shim stack.

15. The shock damper according to claim 12, wherein the shear-thickening fluid is selected to operate in a shear-thickening region in response to the piston at least one of extending or compressing.

16. The shock damper according to claim 12, wherein the shear-thickening fluid is selected to operate in at least two of a shear-thickening region, a shear-thinning region, or a nominal equilibrium region in response to the piston at least one of extending and compressing.

17. The shock damper according to claim 12, wherein the shear-thickening fluid comprises a colloidal dispersion comprising:
    a liquid; and
    a plurality of particles, wherein each particle comprises at least one of a condensed polymer, an oxide, or a metal suspended in the liquid,
    wherein a viscosity of the shear-thickening fluid is a function of an applied shear stress.

18. The shock damper according to claim 17, wherein each of the particles further comprises a grafted polymer brush.

* * * * *